US009891727B2

(12) United States Patent
Smus

(10) Patent No.: US 9,891,727 B2
(45) Date of Patent: Feb. 13, 2018

(54) SIMULATING MULTI-TOUCH EVENTS ON A BROWSER SYSTEM

(75) Inventor: Boris Smus, San Francisco, CA (US)

(73) Assignee: Google LLC, Mountain View, CA (US)

( * ) Notice: Subject to any disclaimer, the term of this patent is extended or adjusted under 35 U.S.C. 154(b) by 683 days.

(21) Appl. No.: 13/415,619

(22) Filed: Mar. 8, 2012

(65) Prior Publication Data
US 2015/0205393 A1 Jul. 23, 2015

(51) Int. Cl.
G06F 3/041 (2006.01)
G06F 3/0488 (2013.01)
G06F 17/30 (2006.01)

(52) U.S. Cl.
CPC .......... *G06F 3/041* (2013.01); *G06F 3/0416* (2013.01); *G06F 3/0488* (2013.01); *G06F 17/30873* (2013.01); *G06F 2203/04104* (2013.01); *G06F 2203/04808* (2013.01)

(58) Field of Classification Search
CPC ...................................... G06F 3/041
USPC ........................................ 345/173
See application file for complete search history.

(56) References Cited

U.S. PATENT DOCUMENTS

| | | | | |
|---|---|---|---|---|
| 2005/0283528 A1* | 12/2005 | Rosu | ...................... | G06Q 10/10 709/224 |
| 2008/0093130 A1* | 4/2008 | Lee | ...................... | G06F 3/0416 178/18.01 |
| 2008/0195419 A1* | 8/2008 | Wedwick | ............... | G06Q 30/00 705/2 |
| 2009/0284479 A1* | 11/2009 | Dennis | ................ | G06F 3/04883 345/173 |
| 2010/0020025 A1* | 1/2010 | Lemort | ............... | G06F 3/04883 345/173 |
| 2011/0175825 A1* | 7/2011 | Chen | .................... | G06F 3/03547 345/173 |
| 2012/0290940 A1* | 11/2012 | Quine | ...................... | G06F 8/34 715/744 |
| 2013/0042190 A1* | 2/2013 | Ciloci | .................... | G06Q 10/10 715/764 |

OTHER PUBLICATIONS

Smus, "Multi-Touch for your Desktop Browser" published May 2, 2011, retrieved from <http://smus.com/multi-touch-browser-patch> on Jan. 22, 2013, 3 pages.
Matt Brubeck, Sangwhan Moon & Doug Schepers, Touch Events version 1, W3C Candidate Recommendation, Dec. 15, 2011, 12 Pages.

* cited by examiner

*Primary Examiner* — Jennifer Mehmood
*Assistant Examiner* — Carl Adams
(74) *Attorney, Agent, or Firm* — McDermott Will & Emery LLP

(57) ABSTRACT

Technology provided here facilitates simulating multi-touch events on a browser system. In one example, a browser system receives low-level touch events from a touch-input system. The browser system generates script-callbacks from the low-level touch events. The browser system converts the script-callbacks into compliant touch events that are compliant with a multi-touch browser standard. The browser system then sends the compliant touch events to a web application. This Abstract is submitted with the understanding that it will not be used to interpret or limit the scope or meaning of the claims.

26 Claims, 5 Drawing Sheets

SIMULATING MULTI-TOUCH EVENTS ON A BROWSER SYSTEM

BACKGROUND

Mobile devices, such as smart phones and tablets, usually have a capacitive touch-sensitive screen to capture interactions made with the user's fingers. Many desktops are equipped with multi-touch hardware. For example, most current Apple Mac™ computers are equipped with a multi-touch-enabled input device of some sort. Multi-touch refers to the ability of a touch-sensing surface (e.g., trackpad or touchscreen) to recognize the presence of two or more points of contact with the surface.

SUMMARY

The present technology simulates multi-touch events on a browser system. In one example, a method includes the following: receiving low-level touch events from a touch-input system, wherein a low-level touch event is data that describes an activity at a contact point of a touch-sensing surface of the touch-input system; generating script-callbacks from the low-level touch events, wherein a script-callback includes properties that describe a contact point at the touch-sensing surface of the touch-input system, and wherein the script-callbacks enable the browser system to communicate with the touch-input system; converting the script-callbacks into compliant touch events that are compliant with a multi-touch browser standard; and sending the compliant touch events to a web application.

The technology encompasses other implementations configured as set forth above and with other features and alternatives. This summary is not intended to identify key features or essential features of the claimed subject matter, nor is it intended to be used as an aid in determining the scope of the claimed subject matter.

BRIEF DESCRIPTION OF THE DRAWINGS

Implementations described herein will be readily understood by the following detailed description in conjunction with the accompanying drawings.

DETAILED DESCRIPTION

The technology here addresses the problem of conventional desktop browsers being unable to handle multi-touch events. As the mobile web evolves to enable increasingly sophisticated applications, web developers need a way to handle multi-touch events. For example, nearly any fast-paced game requires the player to press multiple buttons at once, which, in the context of a touchscreen, implies multi-touch. In mobile development, it is often easier to start prototyping on a desktop and later tackle the mobile-specific parts on supported devices.

Unfortunately, a conventional desktop browser is not configured to handle multi-touch input. Even though an operating system of a desktop computer may be equipped to handle multi-touch input, conventional desktop browsers are unequipped to handle multi-touch input from a multi-touch input device. As a result, a web application is unable to respond to multi-touch events due to conventional desktop browsers being unable to handle multi-touch events.

Implementations of the technology enable a developer to write a multi-touch web application (e.g., video game) for a browser system on a computer (e.g., desktop computer or laptop computer). As a result, a mobile computer (e.g., tablet or cell phone) may run the substantially same multi-touch web application.

Browser Capable of Simulating Multi-Touch Events

Figure 1:
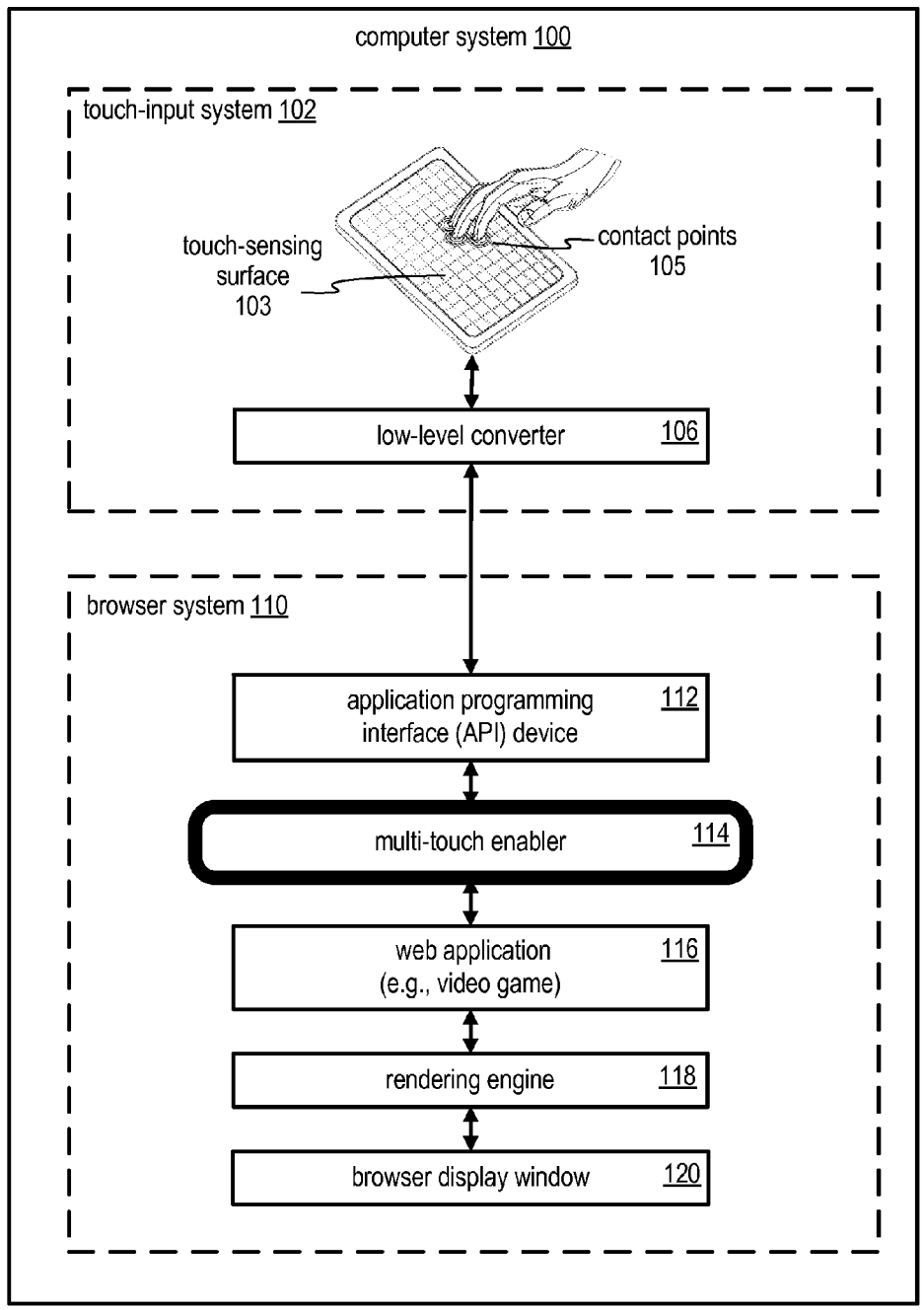
FIG. 1 is a block diagram of a computer system configured to simulate multi-touch events.

FIG. 1 is a block diagram of a computer system 100 configured to simulate multi-touch events. The computer system 100 includes a browser system 110 and a touch-input system 102, among other systems. Although the computer system 100 may include an operating system that is able to handle multi-touch events, a conventional browser system running on the computer system 110 would be unable to handle multi-touch events. Fortunately, the browser system 110 is able to handle multi-touch events, as further described below.

The browser system 110 is coupled to a touch-input system 102. The browser system includes an application programming interface (API) device 112, a multi-touch enabler 114, a web application 116, a rendering engine 118, and a browser display window 120, among other devices. The touch-input system 102 includes a touch-sensing surface 103 and a low-level converter 106, among other devices.

The touch-input system 102 can recognize the presence of one or more contact points 105 via the touch-sensing surface 103. The contact points 105 are typically associated with a finger, a stylus, and/or a pointing device, among other things. Examples of the touch-input system 102 include a touchscreen, a trackpad, and/or any device that supports multi-touch input. The touch-sensing surface 103 receives touch input and generates raw touch-signals. The touch-sensing surface 103 sends raw touch-signals to a low-level converter 106.

The low-level converter 106 is software on the operating system of the computer system 100 that converts raw touch-signals into low-level touch events that the browser system 110 can interpret. The low-level converter 106 allows the browser system 110 to communicate directly with the touch-input system 102. An example of a low-level converter 106 is the TongSeng TUIO (tangible user interface objects) tracker for the Mac MagicPad™. TongSeng TUIO is a software wrapper for the Mac OS™ that generates low-level touch events that comply with a TUIO (tangible user interface objects) protocol.

The low-level converter 106 continually sends low-level touch events to the API device 112 as fingers touch and move across the touch-sensing surface. A low-level touch event provides a snapshot of each touch during a multi-touch sequence or single-touch sequence, particularly the touches that are new or have changed for a particular target. For example, a multi-touch sequence may begin when a finger first touches the surface. Other fingers may subsequently touch the surface, and all fingers may move across the surface. The sequence may end when the last of these fingers is lifted from the surface. The API device 112 receives touch events during each activity of a touch.

A low-level touch event is data that describes an activity at a contact point 105 of the touch-sensing surface 103. Examples of low-level touch events are provided below in Table 1:

TABLE 1

Examples of low-level touch events generated by the low-level converter.

touch-start (sent upon an initial contact on the surface)
touch-move (sent when a contact moves on the surface)
touch-end (sent when a contact ends on the surface)

The API device 112 receives low-level touch events from the low-level converter 106 and generates script-callbacks. An example of the API device 112 is a NPAPI plug-in (Netscape Program Application Program Interface plug-in). Alternatively, the API device 112 may be code built into the browser system 110, rather than a plug-in added to the browser system 110. The script-callbacks can be JavaScript™ callbacks, or callbacks of another scripting language that enables dynamic and interactive Web pages.

Script-callbacks enable the browser system 110 to communicate with the touch-input system 102. The properties of a script-callback include details that describe a touch event (e.g., activity of a contact point at the touch-sensing surface). Properties include, for example, an identifier of a contact, a position of a contact, and/or a type of a contact, among other properties. Examples of properties of a script-callback are provided below in Table 2:

TABLE 2

Examples of properties of a script-callback generated by the API device.

identifier (e.g., ID = contact #4)
position (e.g., x position = 125, y position = 200)
type (e.g., start, move, or end)

A problem here is the properties (e.g., identifier, position, type, etc.) of a script-callback are in a format that is incompliant with a multi-touch browser standard. At this point, a web developer would still have difficulty developing a web application on the browser system that would reliably run on a mobile device. Accordingly, the API device 112 is configured to send the script-callbacks to the multi-touch enabler 114.

The multi-touch enabler 114 receives script-callbacks from the API device 112 and generates compliant touch events that comply with a multi-touch browser standard, such as the W3C™ (World Wide Web Consortium) Touch Events standard, which is hereby incorporated by reference in its entirety. These compliant touch events can also be JavaScript™ events and JavaScript™ function call backs, but in a standardized format instead of the format generated by API device 112. Accordingly, a web application can be written that uses these compliant touch events, and then run within any web browser capable of producing compliant touch events. For example, a web application written, tested, and run on the desktop, can be expected to behave the same when that web application is run on a mobile device in a mobile browser, because that mobile browser can also generate compliant touch events for the web application. Touch events generated by an operating system like Windows of Mac OS™ can be processed by the native browser into compliant touch events for the web application. Similarly, touch events generated by a mobile operating system, which may be different than those generated by a desktop operating system, can also be processed by the mobile web browser to generate compliant touch events. In some cases, a particular operating system or browser may generate compliant touch events, removing the need to process incompliant events into compliant events.

An example of the multi-touch enabler 114 is a script library that complies with a scripting language that enables dynamic and interactive Web pages. For instance, the multi-touch enabler 114 can be a JavaScript™ library. Example implementations of the multi-touch enabler 114 include an aftermarket browser plug-in and/or code that is built into the code of the browser system 110.

Continuing with FIG. 1, the multi-touch enabler 114 identifies properties of script-callbacks. As described above, example properties of a script-callback include an identifier, a position, and/or a type, among other properties. An identifier uniquely distinguishes each contact point from other contact points at the touch-sensing surface. A position describes the location of a contact point at the touch-sensing surface by using, for example, horizontal and vertical coordinates. A type describes a particular contact as being a start (e.g., a finger initially touching a track pad), a move (e.g., a finger moving on a track pad), and/or an end (e.g., a finger lifting off a track pad).

The multi-touch enabler 114 generates compliant touch events by applying a multi-touch browser standard to the incompliant properties of the script-callbacks. In particular, the multi-touch enabler 114 may convert an incompliant identifier into a compliant identifier, may convert an incompliant position into a compliant position, and/or may convert an incompliant type into a compliant touch type, and so on. The result is a compliant touch event that includes one or more of these compliant properties. Examples of properties of a compliant touch event are provided below in Table 3:

TABLE 3

Examples of properties of a compliant touch event generated by the multi-touch enabler.

identifier in a format that complies with W3C ™
position in a format that complies with W3C ™
type in a format that complies with W3C ™

The multi-touch enabler 114 of FIG. 1 sends compliant touch events to the web application 116. The web application 116 (e.g., video game) receives compliant touch events and can then combine the compliant touch events to perform high-level actions. For example, the web application 116 can perform high-level functionality by interpreting touch events as being a multi-point gesture or a single-point gesture. Examples of high-level actions of the web application 116 are provided below in Table 4:

TABLE 4

Examples of high-level actions of a web application.

zooming out upon interpreting compliant touch events as being two fingers pinching together
zooming in upon interpreting compliant touch events as being two finger un-pinching apart
activating a program upon interpreting compliant touch events as being four fingers swiping
rotating an image upon interpreting compliant touch events as being two fingers rotating
moving a graphical object upon interpreting compliant touch events as being one stylus swiping The web application 116 can then generate properly formatted content and send the properly formatted content to the rendering engine 118. The rendering engine 118 receives the formatted content from the web application 116 and instructs the browser display window 120 to display the formatted content.

Accordingly, the compliant touch events enable the web application 116, and thus the browser display window 120 and the browser system 110, to function reliably. The technology enables a developer to write a multi-touch web application (e.g., video game) for a browser system on a computer (e.g., desktop computer or laptop computer). As a result, a mobile computer (e.g., tablet or cell phone) may run the substantially same multi-touch web application.

Figure 2:
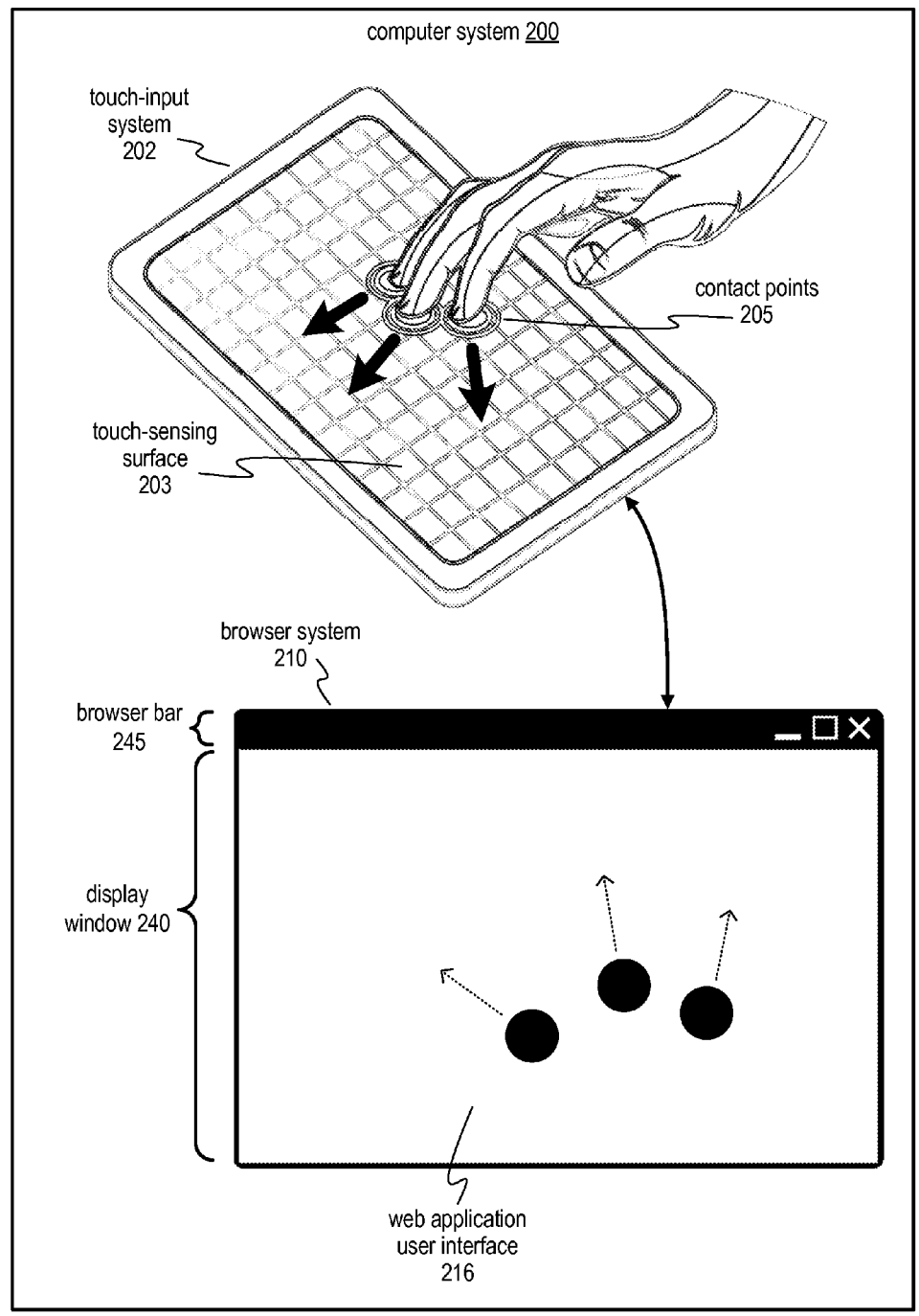
FIG. 2 is an example of user interface of a web application running on a browser system of a computer system.

FIG. 2 is an example of a user interface 216 of a web application running on a browser system 210 of a computer system 210. The computer system 200 includes a touch-input system 202 coupled to a browser system 210, among other systems. The browser system 210 can run on a desktop computer, a laptop computer, or other computer.

The web application running on the browser system 210 of FIG. 2 is equipped to respond reliably to touch events from the touch-input system 202. As illustrated, the user interface 216 displays formatted content on the display window 240 in a reliable manner with respect to the contact points 205. Accordingly, the web application, interactive via the display window 240, functions reliably with respect to the contact points 205 at the touch-sensing surface 203.

Examples of the web application include a video game, a web application, or a mobile web application, among other applications. The web application may be developed by using various resources, such as HTML (Hypertext Markup Language) files, XML (Extensible Markup language) files, CSS (Cascading Style Sheet) files, XSL (eXtensible Stylesheet Language) files, JavaScript™ files, image files (e.g., JPEG, GIF, PNG, etc.), and/or other resources.

Method Overviews

Figure 3:
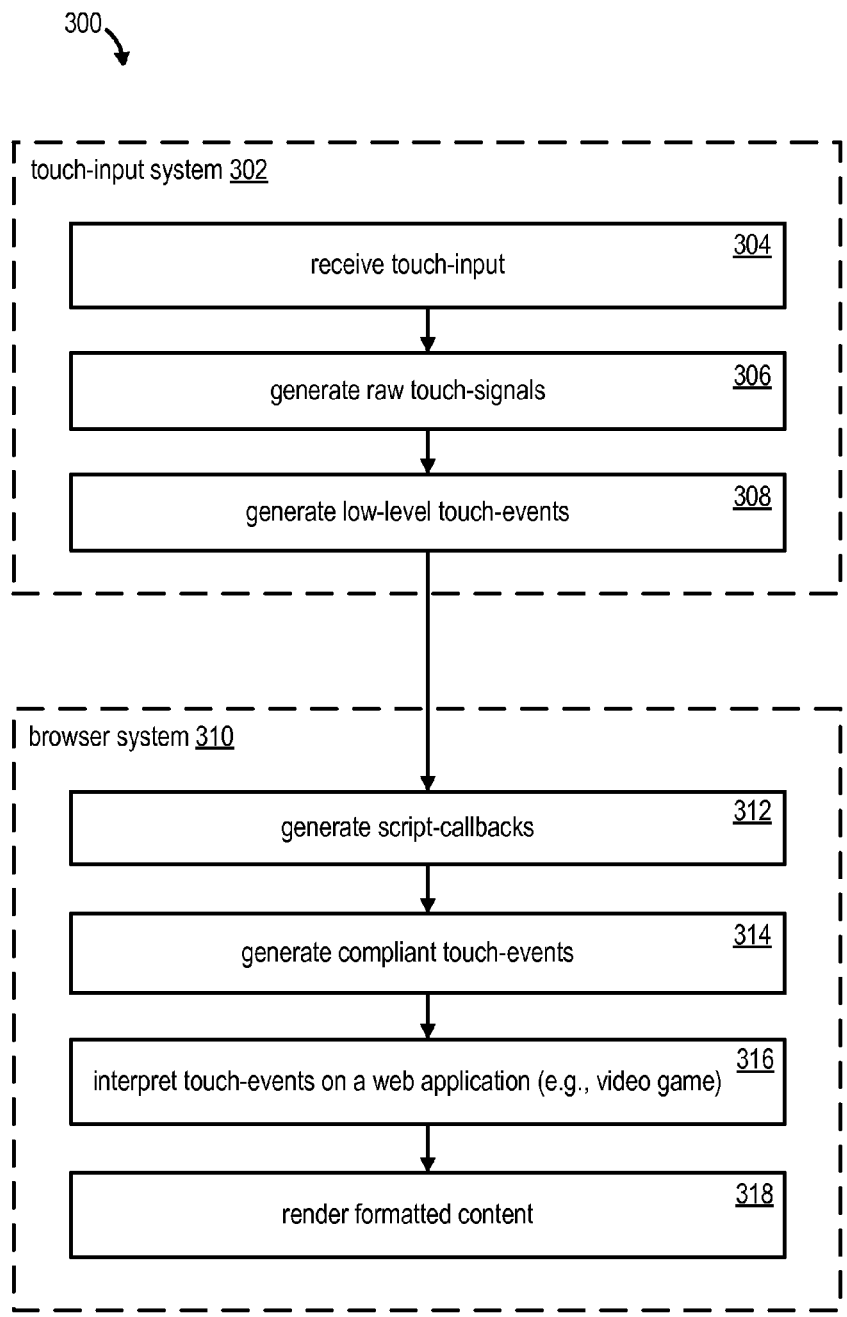
FIG. 3 is an overview of a method for simulating multi-touch events on a browser system.

FIG. 3 is an overview of a method 300 for simulating multi-touch events on a browser system 310. In some implementations, the computer system 100 of FIG. 1 may carry out this method 300 of FIG. 3.

In an act 304, the touch-input system 302 receives touch-input. For example, a touch-sensing surface recognizes the presence of one or more contact points.

In an act 306, the touch-input system 302 generates raw touch-signals. For example, a touch-sensing surface generates raw touch-signals and sends the raw touch-signals to a low-level converter.

In an act 308, the touch-input system 302 generates low-level touch events. For example, a low-level converter may generate low-level touch events that comply with a TUIO (tangible user interface objects) protocol.

In an act 312, the browser system 310 generates script-callbacks from the low-level touch events. For example, a NPAPI (Netscape Program Application Program Interface) plug-in device may generate callbacks that comport with JavaScript™ or another scripting language that enables a generating of dynamic and interactive Web pages.

In an act 314, the browser system 314 generates compliant touch events from the script-callbacks. For example, a multi-touch enabler may generate compliant touch events that comply with the Touch Events specification of the W3C™ (World Wide Web Consortium). A multi-touch enabler is also discussed below with reference to FIG. 4.

In an act 316, the web application running on the browser system 314 interprets the touch events. For example, a video game receives compliant touch events from the multi-touch enabler of the browser system 310.

In an act 318, the browser system 310 renders the formatted content in a reliable manner. For example, the browser system 310 renders the graphics of a video game in a reliable manner on a display window of the browser system 310. The graphics of the video game reliably correlate with the activity of the contact points discussed above with respect to the act 304.

Figure 4:
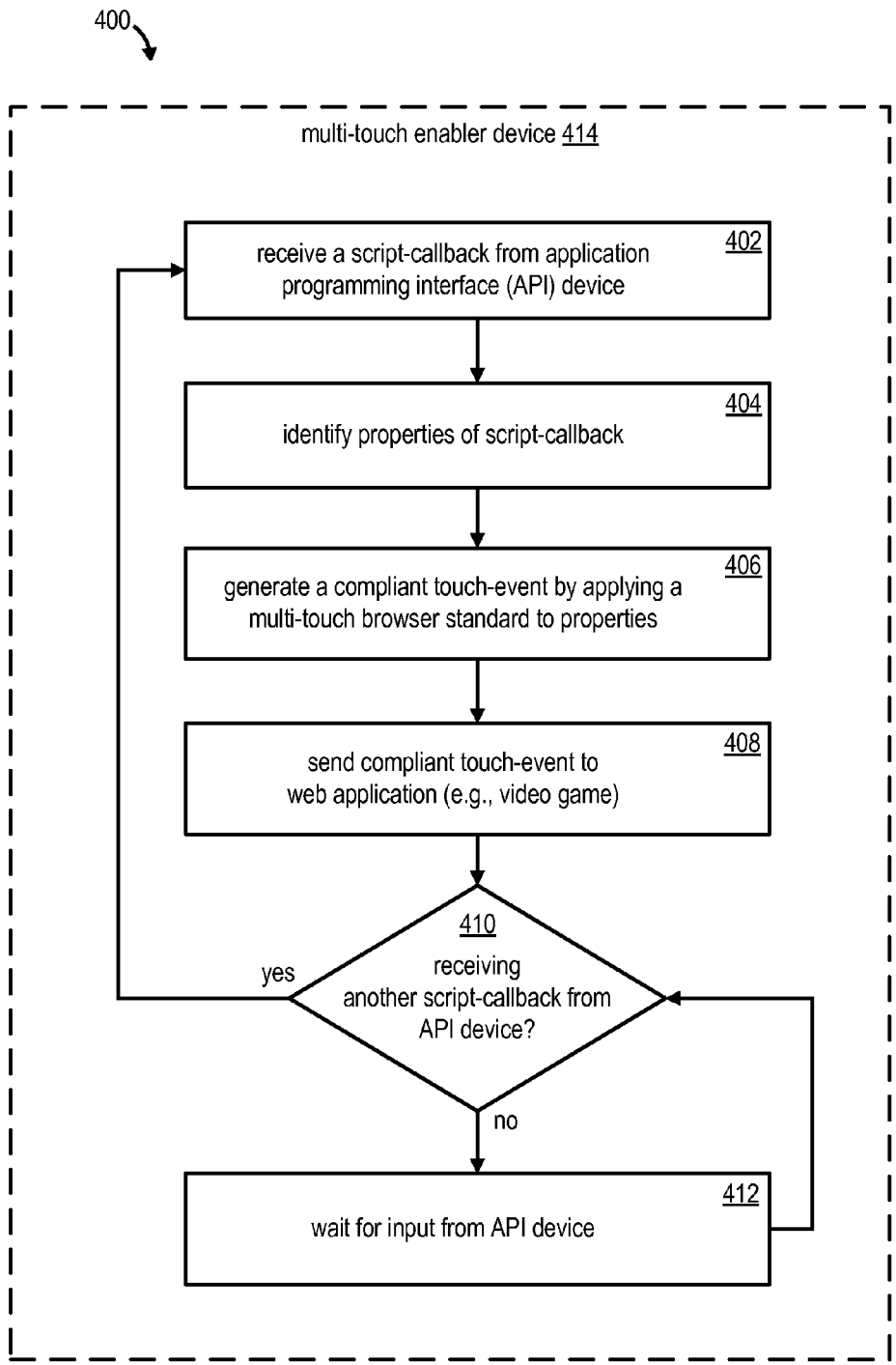
FIG. 4 is an overview of a method for the multi-touch enabler of FIG. 1.

FIG. 4 is an overview of a method 400 for the multi-touch enabler 114 of FIG. 1. In an act 402, the multi-touch enabler 414 receives a script-callback from an API (application programming interface) device. For example, the multi-touch enabler 414 may include a JavaScript™ library that is configured to receive and interpret a JavaScript™ callback.

In an act 404, the multi-touch enabler 414 identifies properties of the script-callback. The properties include details that describe a particular contact point at the touch-sensing surface.

In an act 406, the multi-touch enabler 414 generates a compliant touch event by applying a multi-touch browser standard to the incompliant properties of the script-callback. For example, the multi-touch enabler 414 may convert the incompliant properties to a compliant touch event. The compliant touch events can be generated using a conversion code (e.g., a set of JavaScript™ functions or a JavaScript™ library) running within the web browser, for example, as part of the developed web application, a background page, a web application, or a browser extension. This conversion code may also be included in the web application itself, and dynamically enabled as necessary depending on the platform. Alternatively, the code may be enabled while developing an application on one platform, such as a desktop platform, and then disabled before that code is deployed for another platform, such as a mobile platform. This conversion code can create new compliant JavaScript™ events and JavaScript™ callbacks based on incompliant Javascript™ events and callbacks, for example, by changing properties of the incompliant events into a format that complies with a multi-touch standard.

In an act 408, the multi-touch enabler 414 sends the compliant touch event to a web application. The web application may include an application (e.g., video game) that is interactive via a display window of the browser system. The multi-touch enabler 414 enables the web application to function reliably with respect to the particular contact point at the touch-sensing surface.

In a decision operation 410, the multi-touch enabler 414 determines if another script-callback is being received from the API device. Script-callbacks are typically rapidly occurring. For example, the multi-touch enabler 414 may receive as many as hundreds, or even thousands, of script-callbacks per second. Accordingly, this decision operation 410 and other acts in this method 400 are rapidly occurring. This decision operation 410 is primarily where the multi-touch enabler 414 determines if there is a multi-touch situation. For example, if a contact at the touch-sensing surface has not ended before another contact starts, then the multi-touch enabler 414 is likely in the midst a multi-touch situation. Accordingly, the multi-touch enabler 414 can handle multi-touch events (e.g., two or more contact points at once) or a single touch event (e.g., one contact point at once).

If the multi-touch enabler 414 is not in the midst of receiving another script-callback from the API-device (e.g., if there is no activity of a contact at the touch-sensing surface), then the method 400 moves to an act 412 where the multi-touch enabler 414 waits for input from the API device.

The multi-touch enabler 414 may continue this loop of waiting and determining if a script-callback is being received, until the multi-touch enabler 414 receives another script-callback.

If the multi-touch enabler 414 determines a script-callback is being received at decision operation 410, then the method 400 moves to the act 402 where the multi-touch enabler 414 receives this script-callback. The method 400 continues until, for example, the computer system deactivates the touch-input device, deactivates the browser system, and/or shuts down, among other reasons for discontinuing the method 400.

Note these methods may include other acts and/or details that are not discussed in these method overviews. Other acts and/or details are discussed with reference to other figures and may be a part of the methods, depending on the implementation.

Example Computer Implementation

Figure 5:
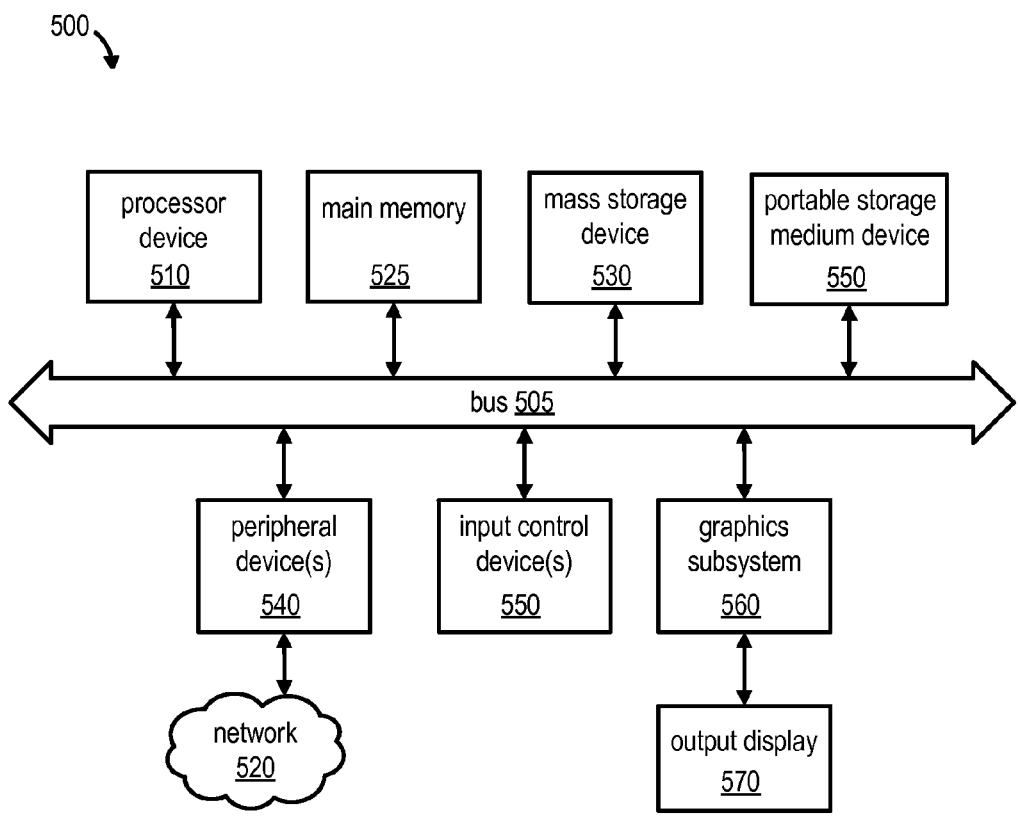
FIG. 5 is a block diagram of a general purpose or special purpose computer system.

FIG. 5 is a block diagram of a general purpose or special purpose computer system 500. The computer system 500 may include, for example, a server, a client computer, a user device, and/or a user computer, among other things. A device (e.g., apparatus or machine) is hardware or a combination of hardware and software.

The computer system 500 preferably includes without limitation a processor device 510, a main memory 525, and an interconnect bus 505. The processor device 510 may include without limitation a single microprocessor, or may include a plurality of microprocessors for configuring the computer system 500 as a multi-processor system. The main memory 525 stores, among other things, instructions and/or data for execution by the processor device 510. If the system for generating a synthetic table of contents is partially implemented in software, the main memory 525 stores the executable code when in operation. The main memory 525 may include banks of DRAM (dynamic random access memory), as well as cache memory.

The computer system 500 may further include a mass storage device 530, peripheral device(s) 540, portable storage medium device(s) 550, input control device(s) 580, a graphics subsystem 560, and/or an output display 570. For explanatory purposes, all components in the computer system 500 are shown in FIG. 5 as being coupled via the bus 505. However, the computer system 500 is not so limited. Devices of the computer system 500 may be coupled through one or more data transport means. For example, the processor device 510 and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 540 is preferably a nonvolatile storage device for storing data and/or instructions for use by the processor device 510. The mass storage device 530, which may be implemented, for example, with a magnetic disk drive or an optical disk drive. In a software implementation, the mass storage device 530 is preferably configured to load contents of the mass storage device 530 into the main memory 525.

The portable storage medium device 550 operates in conjunction with a nonvolatile portable storage medium, such as, for example, a CD ROM (compact disc read only memory), to input and output data and code to and from the computer system 500. In some implementations, the software for generating a synthetic table of contents may be stored on a portable storage medium, and may be inputted into the computer system 500 via the portable storage medium device 550. The peripheral device(s) 540 may include any type of computer support device, such as, for example, an I/O (input/output) interface configured to add additional functionality to the computer system 500. For example, the peripheral device(s) 540 may include a network interface card for interfacing the computer system 500 with a network 520.

The input control device(s) 580 provide a portion of the user interface for a user of the computer system 500. The input control device(s) 580 may include a keypad and/or a cursor control device. The keypad may be configured to input alphanumeric and/or other key information. The cursor control device may include, for example, a mouse, a trackball, a stylus, a touchpad, and/or cursor direction keys. In order to display textual and graphical information, the computer system 500 preferably includes the graphics subsystem 560 and the output display 570. The output display 570 may include a CRT (cathode ray tube) display and/or a LCD (liquid crystal display). The graphics subsystem 560 receives textual and graphical information, and processes the information for output to the output display 570.

Each component of the computer system 500 may represent a broad category of a computer component of a general and/or special purpose computer. Components of the computer system 500 are not limited to the specific implementations provided here.

Portions of the present technology may be conveniently implemented by using a general purpose computer, a specialized digital computer and/or a microprocessor programmed according to the teachings of the present description, as will be apparent to those skilled in the computer art. Appropriate software coding may readily be prepared by skilled programmers based on the teachings of the present disclosure. Some implementations may also be implemented by the preparation of application-specific integrated circuits or by interconnecting an appropriate network of component circuits.

Some implementations include a computer program product. The computer program product may be a storage medium and/or media having instructions stored thereon and/or therein which can be used to control, or cause, a computer to perform any of the processes of the technology. The storage medium may include without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer-readable storage medium and/or media, some implementations include software for controlling both the hardware of the general and/or special computer or microprocessor, and for enabling the computer or microprocessor to interact with a human user or other mechanism utilizing the results of the technology. Such software may include without limitation device drivers, operating systems, and user applications. Ultimately, such computer-readable storage media further includes software for performing aspects of the technology, as described above.

Included in the programming and/or software of the general and/or special purpose computer or microprocessor are software modules for implementing the processes described above. The processes described above may include without limitation the following: receiving low-level touch events from a touch-input system, wherein a low-level touch event is data that describes an activity at a contact point of a touch-sensing surface of the touch-input system; generating script-callbacks from the low-level touch events, wherein a script-callback includes properties that describe a contact point at the touch-sensing surface of the touch-input system, and wherein the script-callbacks enable the browser system to communicate with the touch-input system; converting the script-callbacks into compliant touch events that are compliant with a multi-touch browser standard; and sending the compliant touch events to a web application.

CONCLUSION

A technology is provided for simulating multi-touch events on a browser system. Advantageously, the present technology provides a browser system that is configured to function reliably with respect to multi-touch-input. Accordingly, the technology enables a developer to write a multi-touch web application (e.g., video game) for a browser system on a computer (e.g., laptop computer). As a result, a mobile computer (e.g., tablet or cell phone) may run the substantially same multi-touch web application.

In the foregoing specification, the technology has been described with reference to specific implementations thereof. It will, however, be evident that various modifications and changes may be made thereto without departing from the broader spirit and scope of the technology. The specification and drawings are, accordingly, to be regarded in an illustrative rather than a restrictive sense.

What is claimed is:

1. A method to facilitate simulation of multi-touch events on a browser system, the method comprising:
receiving low-level touch events from a touch-input system, the low-level touch events comprising data that describes an activity at a contact point of a touch-sensing surface of the touch-input system, the low-level touch events being converted from raw touch events generated from the touch-input system such that the low-level touch events are capable of being interpreted by the browser system;
generating script-callbacks from the low-level touch events, the script-callbacks comprising properties, the properties comprising a contact identifier, a contact position, and a contact type that describe the activity at the contact point of the touch-sensing surface of the touch-input system, the script-callbacks comprising callbacks of a scripting language, the properties being in a first format incompliant with a multi-touch browser standard;
converting the script-callbacks into compliant touch events by converting each of the properties of the script-callbacks to compliant properties in a second format compliant with the multi-touch browser standard, the compliant touch events comprising the compliant properties that describe the activity at the contact point of the touch-sensing surface of the touch-input system, wherein the converting further comprises at least one of converting, using code built into the browser system, an incompliant position into a compliant position, converting, using the code built into the browser system, an incompliant touch type into a compliant touch type, and converting, using the code built into the browser system, an incompliant identifier into a compliant identifier; and
sending the compliant touch events to a web application configured to combine the compliant touch events to perform high-level actions.

2. The method of claim 1, wherein a multi-touch enabler is configured to convert the script-callbacks into the compliant touch events and the web application is configured to receive the compliant touch events from the multi-touch enabler and generate properly formatted content for a rendering engine of the browser system.

3. The method of claim 1, wherein a multi-touch enabler is configured to convert the script-callbacks into the compliant touch events and the web application is configured to receive the compliant touch events from the multi-touch enabler, and generate properly formatted content for a rendering engine of the browser system, the method further comprising:
receiving the formatted content from the web application; and
instructing a browser display window to display the formatted content.

4. The method of claim 1, wherein a Netscape Program Application Program Interface (NPAPI) plug-in device is configured to generate the script-callbacks.

5. The method of claim 1, wherein a script library that complies with a scripting language that enables dynamic and interactive Web pages is configured to convert the script-callbacks to the compliant touch events.

6. The method of claim 1, wherein the compliant touch events comply with a touch events specification of a World Wide Web Consortium.

7. The method of claim 1, wherein the web application includes at least one of a video game or a mobile web application.

8. The method of claim 1, wherein the touch-input system comprises:
a touch-input surface configured to receive multi-touch-input and generate raw touch-signals; and
a low-level converter configured to receive the raw touch-signals and generate the low-level touch events, wherein the low-level converter complies with a tangible user interface objects (TUIO) protocol, and wherein the low-level touch events include tangible user interface objects (TUIO) protocol events.

9. The method of claim 1, wherein converting the script-callbacks includes identifying the properties of the script callbacks and converting the identified properties to the second format compliant with the multi-touch browser standard.

10. The method of claim 1, wherein the web application is configured to interpret the compliant touch events as multi-point gestures or single-point gestures.

11. The method of claim 1, wherein the incompliant identifier uniquely distinguishes a corresponding contact point from other contact points at the touch-sensing surface, and the compliant identifier comprises a format that complies with a touch events specification of a World Wide Web Consortium.

12. The method of claim 1, wherein the incompliant position describes a location of a corresponding contact point at the touch-sensing surface, the incompliant touch type describes the corresponding contact point as being a start, a move, or an end of a gesture, and wherein the compliant position and the compliant touch type comprise respective formats that comply with a touch events specification of a World Wide Web Consortium.

13. The method of claim 12, wherein the code built into the browser system comprises at least one of a script programming language library or a browser plug-in.

14. A browser system that facilitates simulation of multi-touch events, the browser system comprising:

an application programming interface (API) device configured to receive low-level touch events from a touch-input system and generate script-callbacks from the low-level touch events, the low-level touch events comprising data that describes an activity at a contact point of a touch-sensing surface of the touch-input system, the low-level touch events being converted from raw touch events generated from the touch-input system such that the low-level touch events are capable of being interpreted by the browser system, the script-callbacks comprising properties, the properties comprising a contact identifier, a contact position, and a contact type that describe the activity at the contact point of the touch-sensing surface of the touch-input system, the script-callbacks comprising callbacks of a scripting language, the properties being in a first format incompliant with a multi-touch browser standard; and a multi-touch enabler configured to convert the script-callbacks into compliant touch events by converting each of the properties of the script-callbacks to compliant properties in a second format compliant with the multi-touch browser standard and send the compliant touch events to a web application, the compliant touch events comprising the compliant properties that describe the activity at the contact point of the touch-sensing surface of the touch-input system, wherein the multi-touch enabler is further configured to convert, using code built into the browser system, an incompliant position into a compliant position, convert, using the code built into the browser system, an incompliant touch type into a compliant touch type, and convert, using the code built into the browser system, an incompliant identifier into a compliant identifier.

15. The browser system of claim 14, wherein the web application is configured to receive the compliant touch events from the multi-touch enabler and generate formatted content that is reliable from the low-level touch events received at the API device.

16. The browser system of claim 14, wherein the web application is configured to receive the compliant touch events from the multi-touch enabler and generate formatted content that is reliable from the low-level touch events received at the API device, the browser system further comprising:

a rendering engine configured to receive the formatted content from the web application and instruct a browser display window to display the formatted content.

17. The browser system of claim 14, the API device is at least one of a Netscape Program Application Program Interface (NPAPI) plug-in device or code built into the browser system.

18. The browser system of claim 14, the multi-touch enabler including a script library that complies with a scripting language that enables dynamic and interactive Web pages.

19. The browser system of claim 14, wherein the compliant touch events comply with a touch events specification of a World Wide Web Consortium.

20. The browser system of claim 14, wherein the web application includes at least one of a video game or a mobile web application.

21. The browser system of claim 14, wherein the touch-input system comprises:

a touch-input surface configured to receive multi-touch-input and generate raw touch-signals; and a low-level converter configured to receive the raw touch-signals and generate the low-level touch events, wherein the low-level converter complies with a tangible user interface objects (TUIO) protocol, and wherein the low-level touch events include tangible user interface objects (TUIO) protocol events.

22. The browser system of claim 14, wherein the multi-touch enabler is configured to determine a multi-touch situation if a contact at the touch-sensing surface has not ended before another contact at the touch-sensing surface starts.

23. One or more non-transitory computer-readable storage media storing instructions that when executed cause one or more processors to one or more operations comprising:

receiving low-level touch events from a touch-input system, the low-level touch events comprising data that describes an activity at a contact point of a touch-sensing surface of the touch-input system, the low-level touch events being converted from raw touch events generated from the touch-input system such that the low-level touch events are capable of being interpreted by a browser system;

generating script-callbacks from the low-level touch events, the script-callbacks comprising properties, the properties comprising a contact identifier, a contact position, and a contact type that describe the activity at the contact point of the touch-sensing surface of the touch-input system, the script-callbacks comprising callbacks of a scripting language, the properties being in a first format incompliant with a multi-touch browser standard;

converting the script-callbacks into compliant touch events, wherein converting the script-callbacks includes identifying the properties of the script-callbacks and applying a multi-touch browser standard to each of the identified properties such that the compliant touch events comprise compliant properties in a second format compliant with the multi-touch browser standard, wherein the converting further comprises at least one of converting, using code built into the browser system, an incompliant position into a compliant position, converting, using the code built into the browser system, an incompliant touch type into a compliant touch type, and converting, using the code built into the browser system, an incompliant identifier into a compliant identifier; and sending the compliant touch events to a web application that is interactive by way of a user interface displayed on a browser display window, wherein the compliant touch events enable the web application to function reliably on the browser system.

24. The one or more non-transitory computer-readable storage media of claim 23, wherein a Netscape Program Application Program Interface (NPAPI) plug-in device is configured to generate the script-callbacks.

25. The one or more non-transitory computer-readable storage media of claim 23, wherein a script library that complies with a scripting language that enables dynamic and interactive Web pages is configured to convert the script-callbacks to compliant touch events.

26. The one or more non-transitory computer-readable storage media of claim 23, wherein the compliant touch events comply with a touch events specification of a World Wide Web Consortium.

* * * * *